(12) United States Patent
Busch

(10) Patent No.: US 8,330,401 B2
(45) Date of Patent: Dec. 11, 2012

(54) CIRCUIT UNIT FOR DRIVING AN ELECTRONICALLY COMMUTATED FAN MOTOR

(75) Inventor: Peter Busch, Augsburg (DE)

(73) Assignee: Fujitsu Siemens Computers GmbH, Munich (DE)

(*) Notice: Subject to any disclaimer, the term of this patent is extended or adjusted under 35 U.S.C. 154(b) by 750 days.

(21) Appl. No.: 12/403,494

(22) Filed: Mar. 13, 2009

(65) Prior Publication Data

US 2009/0237017 A1 Sep. 24, 2009

(30) Foreign Application Priority Data

Mar. 20, 2008 (DE) .................. 10 2008 015 297

(51) Int. Cl.
*H02P 6/14* (2006.01)

(52) U.S. Cl. ......... 318/400.01; 318/400.03; 318/400.07; 318/700

(58) Field of Classification Search ............. 318/400.01, 318/400.03, 400.07, 700
See application file for complete search history.

(56) References Cited

U.S. PATENT DOCUMENTS

| | | | |
|---|---|---|---|
| 4,804,892 A | 2/1989 | Mueller | |
| 5,554,913 A * | 9/1996 | Ohsawa | 318/434 |
| 6,188,187 B1 * | 2/2001 | Harlan | 318/400.04 |
| 6,545,438 B1 * | 4/2003 | Mays, II | 318/400.01 |
| 6,650,074 B1 * | 11/2003 | Vyssotski et al. | 318/400.12 |
| 6,703,803 B2 * | 3/2004 | Ohiwa et al. | 318/400.17 |
| 6,815,916 B2 * | 11/2004 | Horng et al. | 318/400.01 |
| 6,828,748 B2 * | 12/2004 | Horng et al. | 318/599 |
| 7,554,279 B2 * | 6/2009 | Loffler et al. | 318/400.07 |
| 7,605,556 B2 * | 10/2009 | Frankel et al. | 318/400.07 |
| 7,880,427 B2 * | 2/2011 | Foll et al. | 318/811 |
| 2003/0117093 A1 * | 6/2003 | Makaran et al. | 318/34 |
| 2003/0155886 A1 * | 8/2003 | Ohiwa et al. | 318/727 |
| 2004/0056617 A1 * | 3/2004 | Berroth et al. | 318/439 |
| 2007/0285042 A1 * | 12/2007 | Frankel et al. | 318/599 |
| 2008/0297084 A1 * | 12/2008 | Berroth et al. | 318/400.22 |
| 2008/0315807 A1 * | 12/2008 | Loffler et al. | 318/400.07 |
| 2009/0315491 A1 * | 12/2009 | Karwath et al. | 318/379 |

FOREIGN PATENT DOCUMENTS

| | | |
|---|---|---|
| DE | 35 37 403 A1 | 4/1987 |
| DE | 40 37 390 C1 | 6/1991 |
| DE | 10 2007 024 354 A1 | 12/2007 |

* cited by examiner

*Primary Examiner* — Kawing Chan
(74) *Attorney, Agent, or Firm* — Slater & Matsil, L.L.P.

(57) ABSTRACT

The invention relates to a circuit unit for driving an electronically commutated fan motor with a power stage for driving windings of the fan motor and with a control stage for driving the power stage. The circuit unit is distinguished in that an operating voltage of the control stage is separated from an operating voltage of the power stage by a diode and in that an arrangement is provided for smoothing the operating voltage of the control stage.

20 Claims, 3 Drawing Sheets

CIRCUIT UNIT FOR DRIVING AN ELECTRONICALLY COMMUTATED FAN MOTOR

This application claims priority to German Patent Application 10 2008 015 297.8, which was filed Mar. 20, 2008 and is incorporated herein by reference.

TECHNICAL FIELD

An embodiment of the invention relates to a circuit unit for driving an electronically commutated fan motor with a power stage for driving windings of the fan motor and a control stage for driving the power stage. A further embodiment of the invention relates to a fan module for cooling components of an electronic device with an electronically commutated fan motor.

BACKGROUND

For cooling components of an electronic device, for example, a computer, components are often mounted on cooling bodies or provided with cooling bodies, in order to increase their surface area for dissipating heat. Typically, for supporting the cooling, fans are used that have an air stream deflected onto the cooling bodies of the temperature-critical components or elements. It is usually not necessary to operate the fans continuously at the highest rotational speed. In the case of processors, for example, only very computationally intense applications require the maximum rotational speed of the fan. Because a high rotational speed of the fan is in most cases associated with a higher noise load for the user, it is desirable to adapt the rotational speed of the fan to the conditions and to reduce the speed as much as possible. For this purpose, controllers are often used that reduce the rotational speed of the fan, for example, as a function of the temperature of the cooled components.

For driving the fans, electronically commutated fan motors that allow noise-free operation relative to collector-commutated motors and that feature higher running power and that emit less electromagnetic interference radiation are often used in electronic devices. Here, it is typical in the market to integrate a circuit unit for driving an electronically commutated fan motor with this motor together in one fan module that can be supplied with direct voltage by means of two terminal wires for operation.

FIG. 2 shows the schematic configuration of such a commercially available fan module 1 according to the state of the art. The fan module 1 includes an electronically commutated fan motor 2 that has windings or coils L1 and L2 that represent the stationary drive of the fan motor 2. For the sake of clarity, in the drawing the windings L1 and L2 are shown outside of the fan motor 2. The windings L1 and L2 are driven by a power stage 3 that has transistors T1 and T2, each connected in series with the windings L1 and L2. The power stage 3 is driven by a control stage 4 that generates, through alternating activation of the transistors T1 and T2, a rotating magnetic field of the stator.

In the fan motor 2, a rotor with a permanent magnet is moved along with this magnetic field. Fan blades are driven by the rotor. The control stage 4 typically has a magnetic sensor that detects the rotational position of the rotor, so that the power stage 3 can be driven corresponding to the detected position of the rotor. Frequently, the control stage 4 is constructed as an integrated circuit in a compact configuration including the magnetic sensor. It is further known to integrate the power stage 3 together with the control stage 4 in a common housing. As other components, the fan module 1 typically has a diode D2 arranged in series with the power stage and the control stage as polarity-inversion protection and a capacitor C2 arranged parallel to the operating voltage of the power stage and control stage for smoothing the operating voltage.

For controlling the rotational speed of the fan motor 2 of the fan module 1, a longitudinal regulating element can be provided to reduce the operating voltage of the fan module 1. The voltage drop on the longitudinal regulating element when the operating voltage of the fan module 1 decreases, however, disadvantageously leads to dissipation loss on the longitudinal regulating element and this dissipation loss is dissipated as heat.

Therefore it is advantageous to reduce the fan voltage by means of a DC converter with pulse width modulation with low losses, as is possible, for example, with the circuit shown in FIG. 3 according to the state of the art.

In the circuit according to FIG. 3, the fan module 1 of FIG. 2 is supplied with current by means of a DC converter, wherein the DC converter has a switching transistor T3, a coil L3, a recovery diode D3, occasionally also referred to as free-wheeling diode D3, and a capacitor C3. The switching transistor T3 is driven with a rectangular, pulse width modulated signal PWM through which the switching transistor T3 is either completely turned on or completely turned off, by means of which the dissipation loss in the switching transistor T3 is minimized. The pulse duty ratio of the pulse-width modulation determines the output voltage of the DC converter and thus also the rotational speed of the fan motor 2.

However, one disadvantage in this type of rotational speed control of the fan motor 2 of a commercially available fan module 1 is that it requires, in addition to the switching transistor T3 and the recovery diode D3, the use of the DC converter made from the coil L3 and the capacitor C3 which, first, increases the cost of the drive circuit and which, second, is associated with additional space requirements, for example, on a main circuit board in a computer.

As another possibility for the rotational speed control of a fan motor, it is known to use the transistors of a power stage of a fan module as switching elements for pulse width modulation. In this case, the control stage of the fan module is designed for a corresponding driving of the power stage and the fan module has, in addition to terminals for providing the operating voltage, an input on which the signal is applied for pulse width modulation. Such a fan module, however, is more expensive and used less universally due to the more complicated internal wiring, due to the additional terminal wire, and due to the terminal plug with several terminals.

SUMMARY

In one aspect, the present invention describes a simple construction for a fan module and a corresponding circuit unit for driving an electronically commutated fan motor that can be used universally and that has the smallest possible number of terminals and that can be rotationally speed-controlled with pulse-width modulation in a simple way.

According to a first aspect of the invention, the problem is solved by a circuit unit for driving an electronically commutated fan motor that has a power stage for driving windings of the fan motor and a control stage for driving the power stage. The circuit unit is distinguished in that an operating voltage of the control stage is separated from an operating voltage of the power stage by a diode and in that an arrangement is provided for smoothing the operating voltage of the control stage.

The circuit unit can be operated advantageously both with direct voltage and also with pulsed, for example, pulse width modulated, direct voltage. Through the diode and the arrangement for smoothing the operating voltage of the control stage, in each case, it is guaranteed that the control stage is supplied not with clocked operating voltage, but instead with a direct current-like, smoothed operating voltage and that the operation of the control stage is not negatively affected. An operation of the power stage and the windings of the fan motor with a pulsed operating voltage basically represents no negative effect on the function of the fan motor. Due to the lower current requirements of the control stage relative to the power stage or the windings of the fan motor, the smoothing of the operating voltage of only the control stage requires less expense than the smoothing of the operating voltage of the entire circuit unit known according to the state of the art. A configuration that is both more economical and takes up less space is provided that can be realized, nevertheless, by means of standard components, in particular, for the control stage.

Preferably, the arrangement for smoothing the operating voltage of the control stage has a capacitor. In an especially preferred way, it also has a resistor and is configured as a low-pass filter. In this configuration, advantageously significant space and cost savings are realized relative to the smoothing of the operating voltage of the circuit unit used according to the state of the art through a DC converter for pulse width modulated current supply.

According to a second aspect of the invention, the problem is solved by a fan module for an electronic device that has an electrically commutated fan motor and a circuit unit for driving the fan motor according to the first aspect of the invention. Advantages correspond to those of the first aspect.

BRIEF DESCRIPTION OF THE DRAWINGS

Below, the invention will be explained in greater detail with reference to embodiments with the aid of the following drawings.

The following list of reference symbols may be used in conjunction with the drawings:

1 Fan module
2 Fan motor
3 Power stage
4 Control stage
D1-D3 Diodes
R1, R2 Resistors
RS Current measurement resistor
T1-T3 Bipolar transistors
T4, T5 Field-effect transistors
C1-C3 Capacitors
L1, L2 Windings
L3 Coil

DETAILED DESCRIPTION

Figure 1:
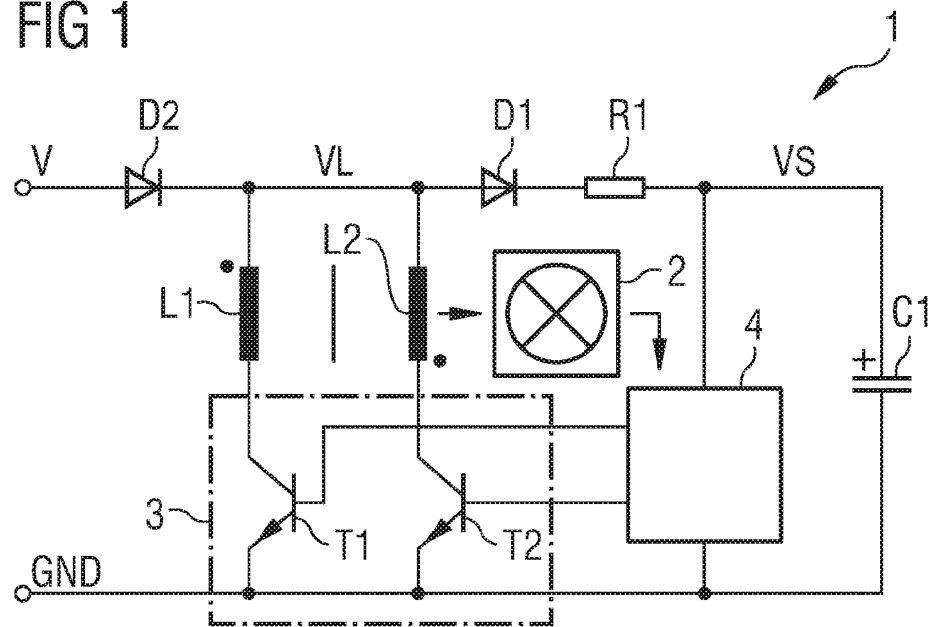
FIG. 1, shows a fan module with electronically commutated fan motor and a circuit unit for driving the electronically commutated fan motor.

FIG. 1 shows a fan module 1 for an electronic device, for example, a computer. The fan module 1 includes a fan motor 2, a power stage 3, and a control stage 4. The fan motor 2 has two windings L1, L2 that are each connected in series with a switching path of a transistor T1, T2 of the power stage 3. The transistors T1 and T2 are driven by the control stage 4. For supplying current, the fan module 1 has two current supply terminals, of which, when activated, one lies at ground potential GND and the other is supplied with an operating voltage V. A diode D2 is provided through which the operating voltage V is fed to the power stage 3 or the windings L1 and L2 as the operating voltage VL of the power stage. Furthermore, a diode D1 and a resistor R1 connected in series with the diode D1 are provided, and through this diode and resistor the operating voltage VL is fed to the power stage 3 as the operating voltage VS of the control stage 4. In addition, both the power stage 3 and also the control stage 4 are connected to the common ground potential GND. In parallel to the current supply terminals of the control stage 4, a capacitor C1 is provided that is charged accordingly with the operating voltage VS of the control stage 4.

In the scope of the application, the operating voltage VL of the power stage 3 designates a voltage applied either to the transistors of the power stage 3 or to the windings L1 and L2. In all of the described embodiments, one terminal of each winding L1, L2 is supplied with the voltage VL and one terminal of each transistor is at ground potential. However, if the sequence of the series circuits made from the transistors T1 and T2 with the corresponding windings L1 and L2, respectively, is reversed, these conditions could be reversed. This is independent of whether the operating voltage V is positive or negative relative to the potential designated as ground potential GND.

Figure 2:
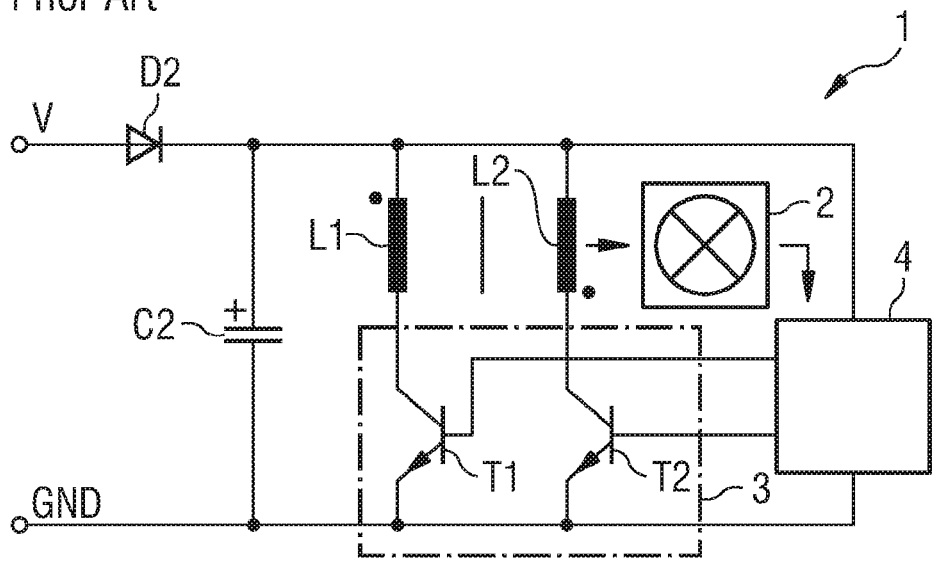
FIG. 2, shows a fan module according to the state of the art.

Up to the diode D1, the resistor R1, and the capacitor C1, the configuration of the fan module 1 of FIG. 1 corresponds to the configuration shown in FIG. 2 and known from the state of the art. In contrast to the circuit layout of FIG. 2, the operating voltage VS of the control stage 4 is decoupled from the operating voltage VL of the power stage 3 by the diode D1 in the fan module according to FIG. 1. The resistor R1 and the capacitor C1 also form a low-pass filter for smoothing the operating voltage VS. Shown is a situation in which the diode is provided in the positive current supply branch. Alternatively, the diode D1 could also be arranged in the negative current supply branch.

In the embodiment of FIG. 1, commercially available components used according to the state of the art can be used as the fan motor 2, power stage 3, and control stage 4. If the fan module 1 of FIG. 1 is operated with a direct voltage, no functional differences to the fan module according to the state of the art are produced. Because the control stage 4 is typically designed for operation with only a small operating voltage VS, the voltage drop on the diode D1 presents no limitation for the operation of the fan module 1. However, if an operation at especially low operating voltages V should be desired, the embodiment shown in FIG. 5 could also be used. In an alternative implementation, the diode D2 can be eliminated if polarity inversion protection for the power stage 4 is not required, because, for example, the transistors T1 and T2 in the non-driven state block current in the opposite direction.

According to the application, the control stage 4 that is typically sensitive to polarity inversion is protected by the diode D1 for all cases.

The advantages of the circuit arrangement according to FIG. 1 will become clear when a pulse width modulated control of the rotational speed of the fan motor 2 is provided.

Figure 4:
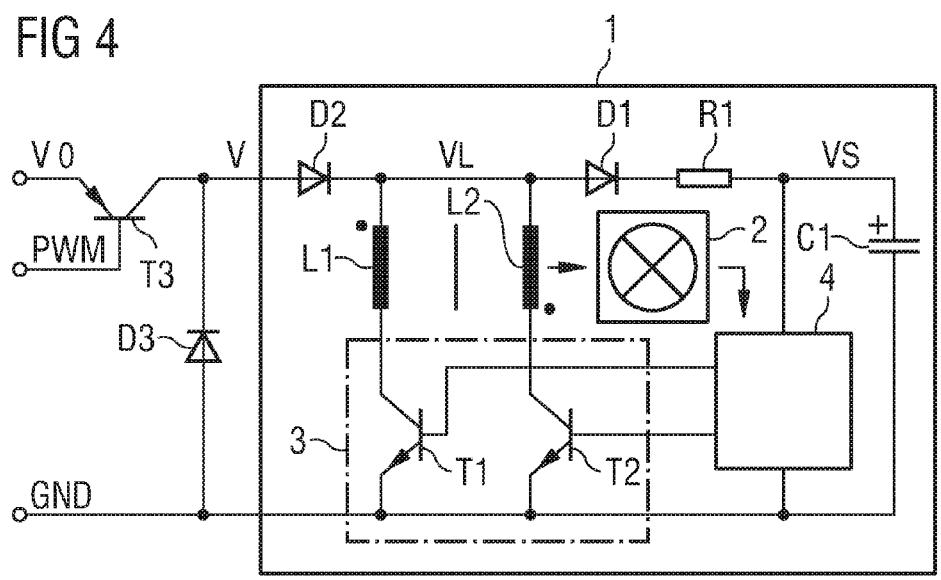
FIG. 4, shows the fan module according to FIG. 1 with a drive circuit for pulse width modulated rotational speed control.

FIG. 4 shows the fan module 1 according to FIG. 1 with additional external circuitry for the pulse width modulated control of the rotational speed of the fan motor 2. The fan module 1 is here connected in series with a switching path of a switching transistor T3. In the blocking direction parallel to the operating voltage of the fan module 1, a recovery diode D3 is provided. The recovery diode D3 allows current to flow through the windings L1 and L2 also during the unclocked phase of the signal for the pulse-width modulation. For supplying current, the transistor T3 is charged with an operating voltage V0. A control signal for the pulse-width modulation PWM is fed to the control input of the switching transistor T3.

During operation, V0 represents the direct voltage supplied for powering the arrangement. As the control signal for the pulse-width modulation PWM, a periodic, rectangular signal is provided such that the switching transistor T3 is either completely conductive or non-conductive. Advantageously, a frequency in the ultrasonic range that is, for example, in the range from about 30 to 40 kHz, is selected, as the cycle frequency of the control signal PWM. A change in the rotational speed of the fan motor 2 is achieved through a variation of the pulse duty factor, that is, the ratio of the time that the switching transistor T3 is conductive within a period, to the time that the switching transistor T3 is non-conductive within a period.

For pulse width modulated driving of the switching transistor T3, the fan module 1 is consequently operated with a pulsed operating voltage V. With the operating voltage V, the operating voltage VL applied to the power stage 3 or to the windings L1 and L2 is pulsed. This, however, is not disadvantageous for the operation of the fan module, in particular, not when the frequencies of the pulse-width modulation do not lie above the switching frequencies of the electronic commutation of the fan motor 2. Typical maximum rotational speeds of the fan motor 2 lie in the region of approximately 3000 1/min that leads to switching frequencies for the electronic commutation of the switching transistors T1 and T2 of 3000 L1/min*2/60 s/min=100 Hz. The cycling through an example pulse-width modulation performed, for example, in the ultrasonic range (see above) is thus higher by the factor of 300 to 400 than the cycle frequency of the electronic commutation, wherein the electronic commutation is not negatively affected by the pulse-width modulation.

Through the diode D1 and the low-pass filter constructed from the resistor R1 and the capacitor C1, however, it is simultaneously guaranteed that the control stage 4 is supplied not with clocked operating voltage VS, but instead with a direct current-like, smoothed operating voltage VS. This is important, because otherwise the function of the control stage 4 could be negatively affected. Relative to the pulse width modulated driving of a fan module shown in FIG. 3 and known from the state of the art, in the circuit arrangement shown in FIG. 4, due to the changed layout of the fan module 1, smoothing of the operating voltage V by the DC converter constructed from the coil L3 and the capacitor C3 could be eliminated.

Figure 3:
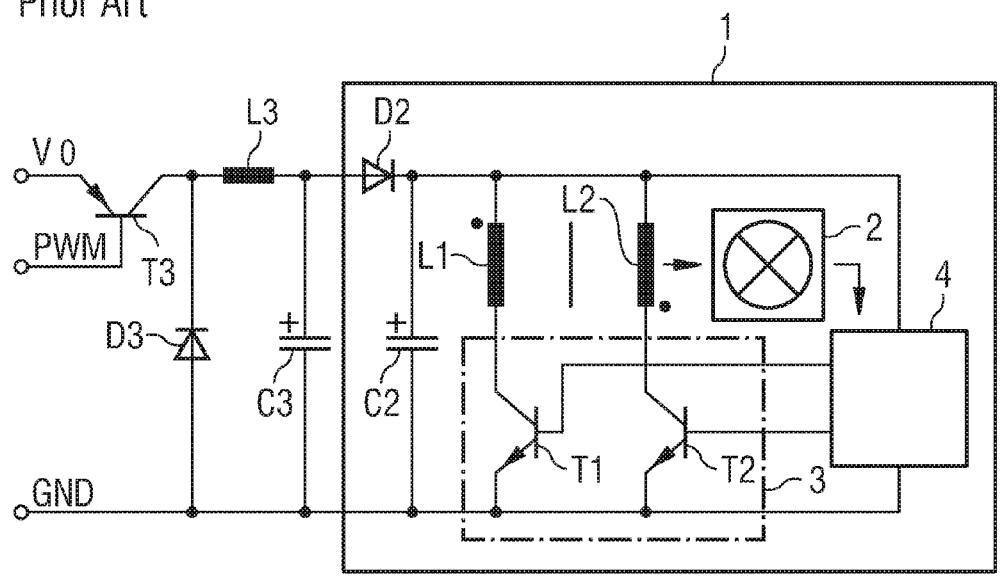
FIG. 3, shows the fan module according to FIG. 2 with a drive circuit for pulse width modulated rotational speed control.

According to the embodiment of FIG. 4, because smoothing is performed only on the operating voltage of the control stage 4 and not on the operating voltage of the power stage 3, the capacitors C2 and C3 can be eliminated. The capacitor C1 used instead can have a significantly lower capacitance than the capacitors C2 and C3 due to the lower power consumption of the control stage 4 compared with the power stage 3. Relative to the pulse width modulated driving with a fan module according to the state of the art, as shown in FIG. 3, a layout that is both more economical and takes up less space is produced.

Figure 5:
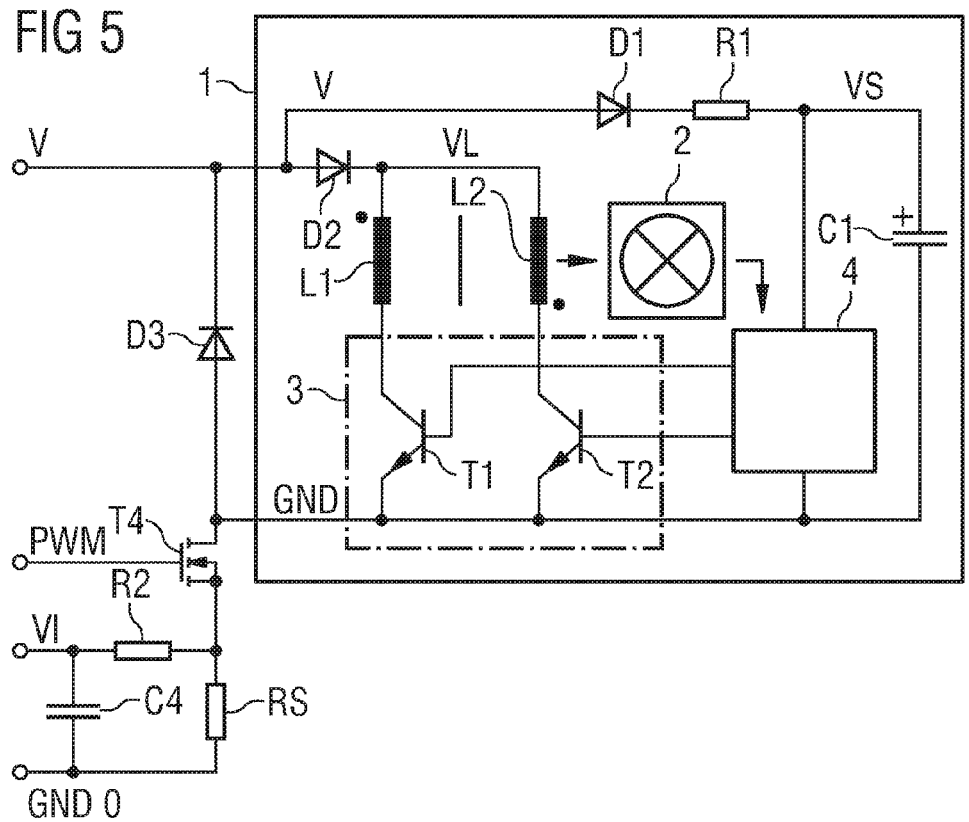
FIG. 5, shows a fan module with electronically commutated fan motor and a circuit unit for driving the electronically commutated fan motor and also a drive circuit for the pulse width modulated rotational speed control and measurement of the operating current of the fan module.

FIG. 5 shows another embodiment of a fan module with an electronically commutated fan motor and a circuit unit for driving the electronically commutated fan motor and also a drive circuit for the pulse width modulated rotational speed control and measurement of the operating current of the fan module.

In contrast to the fan module 1 shown in FIG. 1, in the embodiment of FIG. 5, the diode D1 is supplied with the operating voltage V and not the operating voltage VL through the voltage drop on the diode D2. The decoupling of the operating voltage VS from the operating voltages V and VL, however, is similarly provided.

In contrast to the embodiment of FIG. 4, for the drive circuit for the pulse width modulated rotational speed control, a field-effect transistor T4 can be used as the switching transistor instead of a bipolar transistor. As another difference, this switching transistor is provided in the ground supply line of the fan module. For the use of field-effect transistors, this is advantageous, because n-channel types can be used, and these are more favorable than the p-channel types. As a consequence, in this assembly the ground potential GND0 applied to the circuit differs from the potential GND applied to the fan module 1, while the externally applied operating voltage V matches the operating voltage V of the fan module 1.

In addition, a current measurement resistor RS (shunt) is arranged in series with the switching path, here the source-drain path, of the switching transistor T4, wherein a voltage drop across the current measurement resistor RS is fed via a resistor R2 to a capacitor C4. The voltage VI applied to the capacitor C4 is a measure of the current I consumed by the fan module 1.

Figure 6:
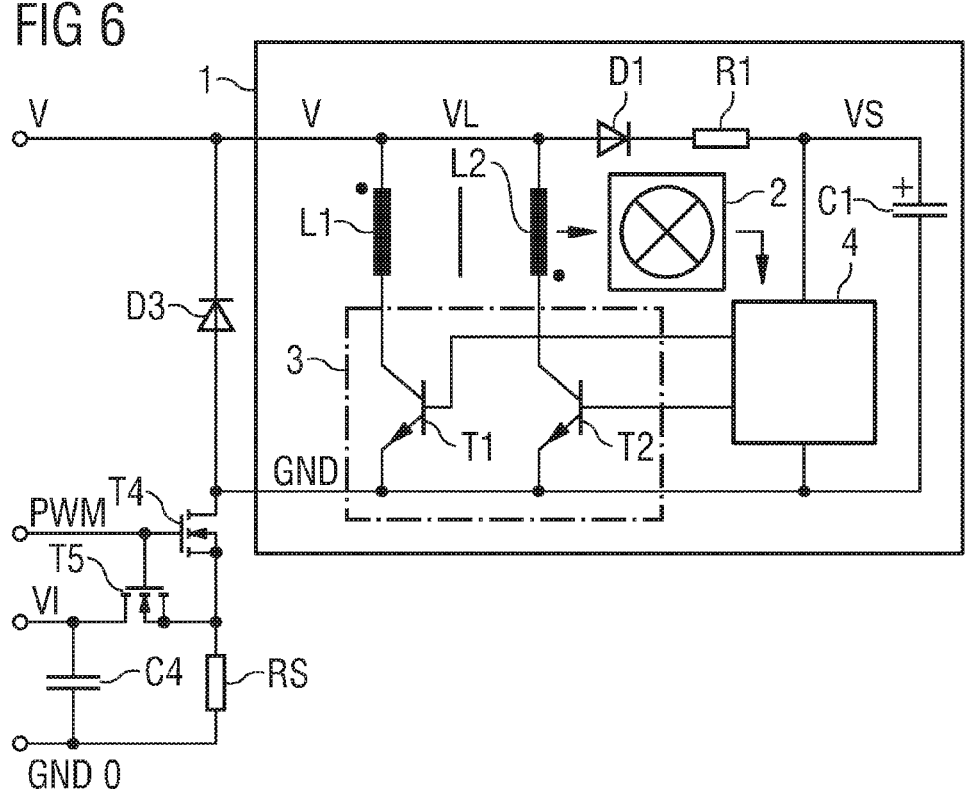
FIG. 6, shows the fan module according to FIG. 5 with an alternative drive circuit for the pulse width modulated rotational speed control and measurement of the operating current of the fan module.

In FIG. 6, another circuit arrangement is shown for the pulse width modulated driving of the fan motor 2 of the fan module 1.

In contrast to the embodiment shown in FIG. 5, for the example of FIG. 6, the diode D2 would be eliminated. The elimination of the voltage drop on D2 leads, at the given operating voltage V, to a higher output of the fan motor 2. This also produces cost savings.

Another difference from the embodiment of FIG. 5 exists in the current measurement. The resistor R2 by means of which the capacitor C4 is connected to the measurement resistor RS is here replaced by the source-drain path of a field-effect transistor T5. The transistor T5 is also driven by the signal for the pulse-width modulation PWM that also controls the transistor T4. Through the transistor T5 it is achieved that the capacitor C4 is connected to the resistor RS only when the fan module 1 is energized. In this way, in the embodiment of FIG. 5, the capacitor C4 is prevented from discharging during the time in which the transistor T4 is non-conductive. As a consequence, the voltage applied to the capacitor C4 is proportional to the current I that flows while the transistor T4 is connected and does not represent the time-averaged current like in the embodiment of FIG. 5. Influences on the pulse duty ratio of the pulse width modulation signal PWM on the current measurement are thus ruled out.

In the embodiments shown in FIGS. 4-6, the arrangement for the pulse-width modulation and optionally also the arrangement for the current measurement are provided outside of the fan module 1. In particular, because a complicated DC converter can be eliminated, the arrangements for pulse-width modulation and/or for current measurement can also be arranged within the fan module 1 that then has a corresponding larger number of terminal wires.

What is claimed is:

1. A circuit unit for driving an electronically commutated fan motor controllable using a pulsed operating voltage, the circuit unit comprising:
   two terminals for carrying the pulsed operating voltage;
   a power stage comprising at least one transistor having a switching path for driving at least one winding of the fan motor, the switching path of the at least one transistor being arranged in series with the at least one winding of the fan motor, wherein the pulsed operating voltage is applied to a terminal of either the at least one transistor or the at least one winding of the fan motor without performing smoothing of the pulsed operating voltage;
   a control stage for driving the power stage;
   a first diode through which the pulsed operating voltage provided by the two terminals and used by the control stage is separated from an operating voltage of the power stage; and
   smoothing circuitry coupled to the first diode and the control stage for smoothing the operating voltage of the control stage.

2. The circuit unit according to claim 1, wherein the smoothing circuitry comprises a capacitor.

3. The circuit unit according to claim 2, wherein the smoothing circuitry further comprises a resistor coupled to the capacitor.

4. The circuit unit according to claim 3, wherein the smoothing circuitry is constructed as a low-pass filter.

5. The circuit unit according to claim 1, further comprising a second diode that is provided as polarity inversion protection between the power stage and one of the two terminals of the circuit unit.

6. The circuit unit according to claim 1, wherein the power stage has bipolar transistors or field-effect transistors as switching elements.

7. A fan module controllable using a pulsed operating voltage, the module comprising:
   two terminals for supplying the pulsed operating voltage;
   an electrically commutated fan motor; and
   a circuit unit for driving the fan motor, the circuit unit comprising:
      a power stage comprising at least one transistor having a switching path for driving at least one winding of the fan motor, the switching path of the at least one transistor being arranged in series with the at least one winding of the fan motor, wherein the pulsed operating voltage is applied to a terminal of either the at least one transistor or the at least one winding of the fan motor without performing smoothing of the pulsed operating voltage;
      a control stage for driving the power stage;
      a first diode through which the pulsed operating voltage provided by the two terminals and used by the control stage is separated from an operating voltage of the power stage; and
      smoothing circuitry coupled to the first diode and the control stage for smoothing the operating voltage of the control stage.

8. The fan module according to claim 7, further comprising:
   a switching element for providing the pulsed operating voltage for a pulse width modulated rotational speed control of the fan motor, the switching element being provided in series connection with the circuit unit for driving the fan motor; and
   a third diode provided as a recovery diode in a blocking direction parallel to the pulsed operating voltage of the power stage or an operating voltage of the circuit unit.

9. The fan module according to claim 8, wherein the switching element comprises a bipolar transistor or a field-effect transistor.

10. The fan module according to claim 7, further comprising a measurement resistor provided in series connection with the circuit unit, the measurement resistor for measuring a current of the fan motor.

11. The fan module according to claim 10, further comprising a capacitor for smoothing a voltage drop across the measurement resistor.

12. The fan module according to claim 11, further comprising a further resistor that couples the capacitor to the measurement resistor.

13. The fan module according to claim 12, further comprising a switching element for a pulse width modulated rotational speed control of the fan motor, the switching element being provided in series connection with the circuit unit.

14. The fan module according to claim 13, wherein the switching element and the further switching element are driven in common.

15. The fan module according to claim 11, further comprising a switching element that couples the capacitor to the measurement resistor.

16. A circuit unit for driving an electronically commutated fan motor, the circuit unit comprising:
   a control stage coupled between a first operating voltage node and a reference supply node;
   a first switching element for driving a first winding of the fan motor;
   a second switching element for driving a second winding of the fan motor, the first and second switching elements coupled to a second operating voltage node and being driven by the control stage, wherein the second operating voltage is a pulsed operating voltage which is applied to either the first switching element and the second switching element or to the first winding of the fan motor and the second winding of the fan motor without performing smoothing of the pulsed operating voltage;
   a first diode coupled between the first operating voltage node and the second operating voltage node; and
   a resistor and a capacitor coupled in series between the first diode and the reference supply node.

17. The circuit unit according to claim 16, further comprising a second diode coupled between the second operating voltage node and a third operating voltage node that receives a pulse width modulated voltage signal.

18. The circuit unit according to claim 16, further comprising:
   a second diode, the first diode and the second diode being coupled in series between the first operating voltage node and the second operating voltage node;
   a third diode coupled to a node between the first diode and the second diode;
   a third switching element coupled to the third diode so that the third diode is between the third switching element and the node between the first diode and the second diode;
   a second resistor coupled between the third switching element and a second reference supply node;

a third resistor coupled to a node between the second resistor and the third switching element; and a second capacitor coupled between the third resistor and the second reference supply node.

19. The circuit unit according to claim 16, further comprising:

a second diode coupled between the second operating voltage node and the reference supply node;

a third switching element coupled between the second operating voltage node and an intermediate node;

a second resistor coupled between the intermediate node and a second reference supply node;

a second capacitor coupled to the second reference supply node; and a fourth switching element coupled between the intermediate node and the capacitor, the third and fourth switching elements being controlled by a pulse width modulated signal.

20. The circuit unit according to claim 16, further comprising:

the first winding, which is coupled between the first switching element and the second operating voltage node; and the second winding, which is coupled between the second switching element and the second operating voltage node.

* * * * *